United States Patent [19]

Monroe

[11] Patent Number: 5,156,786
[45] Date of Patent: Oct. 20, 1992

[54] METHOD FOR MANUFACURING FAN BLADES

[75] Inventor: Robert C. Monroe, Houston, Tex.

[73] Assignee: Hudson Products Corporation, Houston, Tex.

[21] Appl. No.: 546,806

[22] Filed: Jul. 2, 1990

[51] Int. Cl.$^5$ .............................................. B29C 45/14
[52] U.S. Cl. ............................... 264/112; 156/156; 156/228; 156/245; 264/250; 264/258; 264/314
[58] Field of Search ............... 264/314, 257, 258, 255, 264/250, 119, 122, 126, 112; 156/221, 228, 245, 283, 285, 297, 299, 306.6, 313, 156

[56] References Cited

U.S. PATENT DOCUMENTS

| | | | |
|---|---|---|---|
| 2,202,042 | 5/1940 | Blount | 264/258 |
| 2,485,827 | 10/1949 | Hartzell | 264/258 |
| 4,169,749 | 10/1979 | Clark | 156/156 |
| 4,663,225 | 5/1987 | Farley et al. | 264/257 |
| 4,690,860 | 9/1987 | Radvan et al. | 264/257 |
| 4,740,346 | 4/1988 | Freeman | 264/258 |
| 4,808,362 | 2/1989 | Freeman | 264/257 |
| 4,849,147 | 7/1989 | Freeman | 264/258 |
| 4,863,771 | 9/1989 | Freeman | 264/314 |
| 4,911,876 | 3/1990 | Freeman | 264/314 |
| 4,988,469 | 1/1991 | Reavely et al. | 264/258 |
| 5,000,990 | 3/1991 | Freeman | 264/258 |

*Primary Examiner*—Jay H. Woo
*Assistant Examiner*—Robert B. Davis
*Attorney, Agent, or Firm*—Robert J. Edwards; Michael L. Hoelter

[57] ABSTRACT

A method of molding a hollow fan blade in which a preform (preferably constructed of glass fibers) is used to support the upper multiple layers of to-be-impregnated cloth within a mold. As resin is injected into the mold, the cloth and the preform become impregnated thereby bonding the two together to form a single unit during the molding operation.

10 Claims, 1 Drawing Sheet

METHOD FOR MANUFACURING FAN BLADES

FIELD OF THE INVENTION

This invention pertains to a method of manufacturing glass fiber reinforced fan blades and more particularly to the use of a preform for manufacturing hollow, one-piece fan blades.

BACKGROUND OF THE INVENTION

The art of manufacturing fan blades is quite varied. The method used depends on whether the finished fan blade is to be hollow or solid, and whether it is to be one piece or of multiple pieces secured together. The method used also depends on the desired air-foil shape with simple shapes being suitable for pressing while more complex shapes require molding or laying-up techniques. This invention pertains to the construction of hollow, one-piece, glass fiber fan blades of a rather complex configuration such that resin transfer or injection molding is the method of choice. No internal spars or fillers are necessary to provide additional bending strength during operation. This hollow, light construction also produces a blade that is safer to operate as compared to blades with molded-in spars.

In the past, such hollow fan blades were made in two pieces, the first comprising the air foil shape while the second comprised the blade holder that attached the air foil to the rotating shaft or hub. In some cases (U.S. Pat. No. 4,345,877 to R. C. Monroe) the air foil and the blade holder were made of different material. In other cases (U.S. Pat. No. 4,720,244 to Kluppel et al.) the pieces were made of similar material that were then bonded or riveted together.

In the latter, the blade is formed by wrapping multiple glass impregnated cloth layers around a flexible bag within a mold, inflating the bag, and then forcing resin into the mold so as to impregnate the cloths. Afterwards, the fan blade is cured and the flexible bag is removed. In an attempt to more evenly distribute the resin (so as to avoid resin build-up or resin-rich areas which are likely to crack) and to avoid wrinkles, "spreaders" or rigid forms were installed inside the flexible bag and expanded therein to further support the resin impregnated cloths. This spreader was used inside both the blade holder or attachment end as well as inside the air foil end during molding. The insertion and later removal of the spreaders before joining the blade and holder is labor intensive and limits the minimum size and shape of the neck portion of the fan blade. The spreader greatly increased the quality of the product but necessitated making a blade in two pieces since they had to be removed from the interior of each of the parts.

The typical method of making hollow, one-piece fan blades involves using crude cardboard shapes inside the pressurized flexible bags. This, of course, results in a fan blade of non-uniform wall thickness. Additionally, the cardboard shapes produce a fan blade that is full of wrinkles and also of cracked resin-rich areas because of the shifting of the glass fiber cloth within the mold as resin is injected through the neck region. In most normal cases, the cardboard is unable to precisely hold and locate the cloth layers before resin injection.

It is thus an object of this invention to overcome these deficiencies and to provide a method of manufacturing a hollow, one-piece fan blade that is less labor intensive, is stronger, more aesthetically pleasing to the eye and results in fewer rejects than the methods previously used to construct such fan blades. Another object of this invention is to provide a method that specifically reduces the occurrence of resin-rich areas while also providing support and precise placement and retention of the glass fiber cloths so as to reduce their wrinkling or shifting when the resin is forced into the mold. These and other objects of this invention will become obvious upon further investigation.

SUMMARY OF THE INVENTION

A method of manufacturing a hollow fan blade is disclosed comprising the steps of laying glass fiber cloths or other fabric styles in a lower portion of a mold, placing a flexible bag on these cloths within the mold, installing a preform on top of this flexible bag, covering this preform with additional glass fiber cloths, closing the mold, inflating the flexible bag, and injecting resin into the mold around the flexible bag to impregnate both the cloths and the preform thereby bonding the two together into a single unit during molding and curing operations.

DETAILED DESCRIPTION OF THE INVENTION

Figure 1:
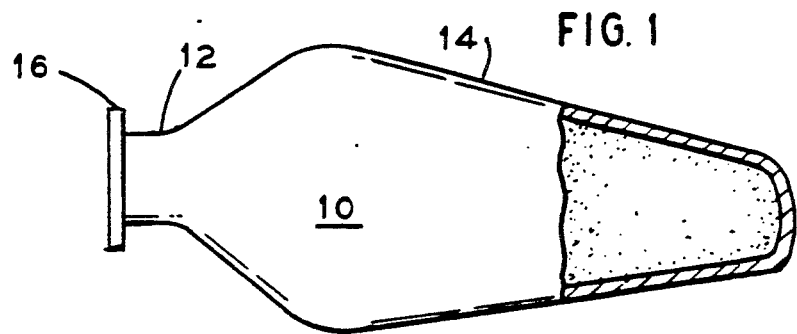
FIG. 1 is a pictorial view partially broken away of the finished fan blade.

Referring initially to FIG. 1, there is shown hollow fan blade 10 having a neck portion 12 and an air foil portion 14. Neck portion 12 is configured with collar 16 for connecting with a rotating shaft or hub (not shown). Air foil portion 14 is configured as needed for the operating conditions, but in any event, its hollow construction is of multi-layered resin impregnated glass fiber cloths. No metallic internal spar is needed to supply adequate strength for safe operation.

Figure 2:
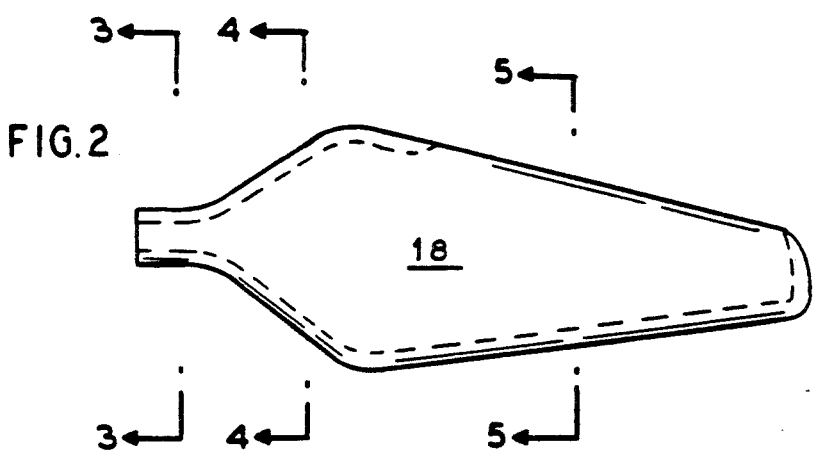
FIG. 2 is a pictorial view of the preform.
Figure 3:
FIG. 3 is a sectional view taken along lines 3—3 of FIG. 2.
Figure 4:
FIG. 4 is a sectional view taken along lines 4—4 of FIG. 2.
Figure 5:
FIG. 5 is a sectional view taken along lines 5—5 of FIG. 2.

Preform 18, as shown in FIG. 2, is used in the construction of fan blade 10, in fact, preform 18 is designed to eventually become a part of fan blade 10. The curvature of preform 18 can vary as needed with typical curvatures illustrated in FIGS. 3, 4, and 5. As can be surmised, preform 18 is designed only to support the upper layers of glass fiber cloths in a mold until they are saturated with resin and cured. The lower layers of the cloths will be supported by the bottom half of the mold. Consequently, the entire shape of fan blade 10 need not be supported by preform 18, only the upper half of it.

Preform 18 is itself preferably constructed of chopped or continuous strand glass fibers which have been shaped as needed by being blown or a glass fiber mat laid onto a mandrel of the desired curvature. After the required thickness has been achieved, the chopped glass fibers are held together by impregnating them with a light resin binder with this mixture then being oven cured to create the desired semi-rigid preform 18. The light binder resin used to hold preform 18 together is compatible with the resin used during the molding of fan blade 10. After preform 18 is cured, it is stripped off its mandrel and used to support the upper layers of the glass fiber cloths in a mold for constructing fan blade 10. Thus, preform 18 is constructed to conform to the finished blade shape for precise cloth placement.

Figure 6:
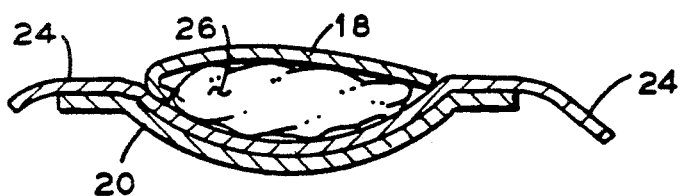
FIG. 6 is a pictorial view of the lay-up operation.
Figure 7:
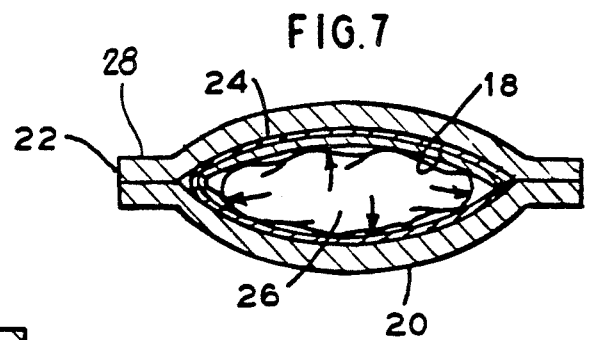
FIG. 7 is a pictorial view of the mold enclosing the preform and flexible bag.
Figure 8:
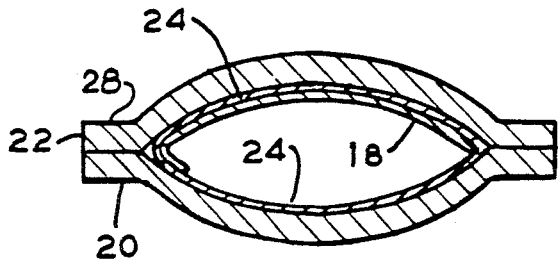
FIG. 8 is a pictorial view of the mold during the curing operation.

Referring now to FIGS. 6-8, the steps required to mold fan blade 10 are shown. Initially, the bottom half 20 of mold 22 is laid with varying layers of glass fiber cloths 24 or some other type of cloth. On top of this, flexible bag 26 is placed which will be pressurized once mold 22 is closed. While flexible bag 26 is still deflated, however, preform 18 is positioned on top of it so as to support the upper layers of cloths 24 which will be folded around it and/or placed on top of it. Because preform 18 is able to maintain and precisely position the dry laid-up cloths 24 within mold 22, the possibility of wrinkles and/or resin-rich areas within mold 22 are greatly reduced, if not completely eliminated.

After mold 22 is closed and clamped by installing upper half 28 of mold 22, flexible bag 26 is inflated through neck portion 12 and subsequently sealed thereby also restraining dry cloths 24 in place within mold 22. Upon proper inflation, resin is pumped or injected into mold 22 via neck portion 12 to saturate both preform 18 and the cloth layers 24 thereby binding the two together. Heat is then applied to cure this mixture afterwhich flexible bag 26 is removed after mold 22 is opened to release newly formed fan blade 10.

The use of preform 18 enables cloths 24 to be maintained at their optimum position upon the closing of mold 22. Additionally, preform 18 can be formed into any continuous shape, straight or tapered, and can easily accommodate a tapered attachment end (neck portion 12) that normally terminates into a cylindrical clamping area for suitable mounting. With the disclosed resin transfer method or resin injection method of molding, a more aerodynamically efficient, stronger and aesthetically pleasing one-piece fan blade can be manufactured.

What is claimed as invention is:

1. A method of manufacturing a hollow fan blade comprising the steps of:
   a. laying glass fiber cloths within a lower portion of a mold;
   b. placing a flexible inflatable bag on said cloths within said mold;
   c. inserting a semi rigid preform conforming to the shape of one side of the blade on top of said flexible bag, said preform being temporarily held together by a suitable resin binder;
   d. covering said preform with said cloths or additional cloths;
   e. closing said mold and inflating said flexible bag;
   f. injecting resin into said mold around said flexible bag thereby both impregnating said cloths and said preform and replacing said resin binder in said preform thereby bonding said cloths and said preform together into a single unit; and,
   g. curing the fan blade, deflating said flexible bag, and removing the fan blade from said mold.

2. The method as set forth in claim 1 further comprising the step of assembling said preform of glass fibers that are held together by said temporary resin binder which dissolves upon the bonding of said cloths and said preform.

3. The method as set forth in claim 2 wherein said preform is constructed of chopped or continuous strand glass fibers.

4. The method as set forth in claim 2 wherein said preform is constructed of a glass fiber mat.

5. The method as set forth in claim 2 wherein said fan blade is of hollow one-piece construction comprising both a neck portion and an air foil portion.

6. A method of constructing hollow fan blades comprising the steps of:
   a. supporting glass fiber material within a mold upon a temporary preform; and,
   b. injecting said preform and said material with resin, said resin replacing the binder resin of said preform, thereby bonding said preform and said material together to form said fan blade.

7. The method as set forth in claim 6 further comprising the steps of assembling said preform of glass fibers that are held together by a temporary resin binder which dissolves during construction of said blade.

8. The method as set forth in claim 7 wherein said preform is constructed of chopped or continuous strand glass fibers.

9. The method as set forth in claim 7 wherein said preform is constructed of a glass fiber mat.

10. The method as set forth in claim 7 wherein said fan blade is of hollow one piece construction comprising both a neck portion and an air foil portion.

* * * * *